April 21, 1970     N. TUMMARELLO     3,507,315
FASTENING MEANS FOR WALL PANELS
Filed Oct. 21, 1968
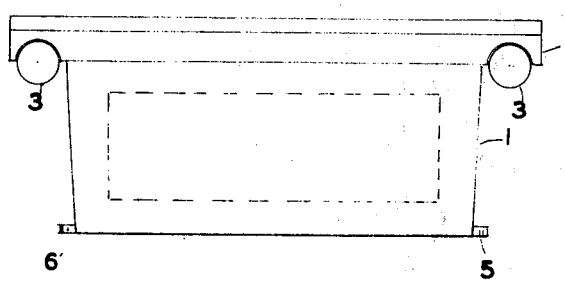
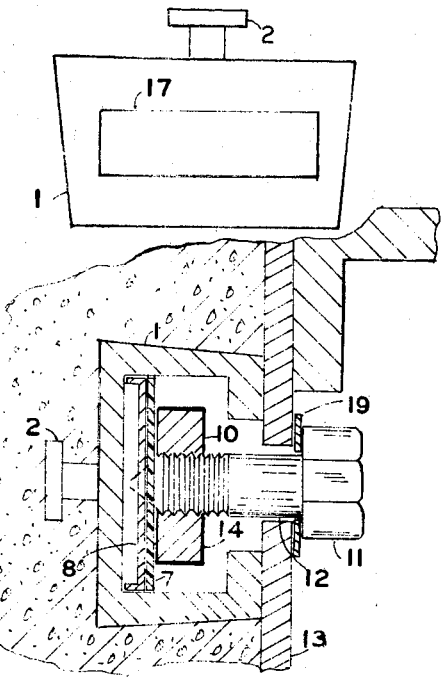
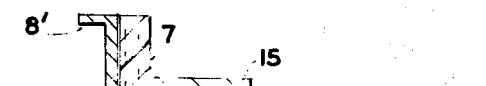
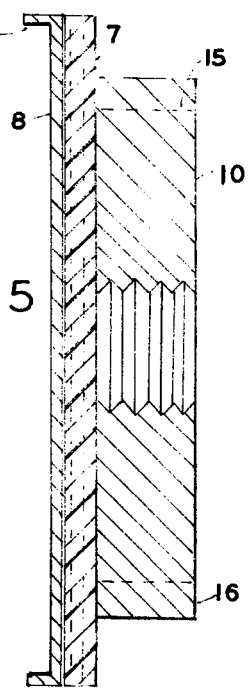
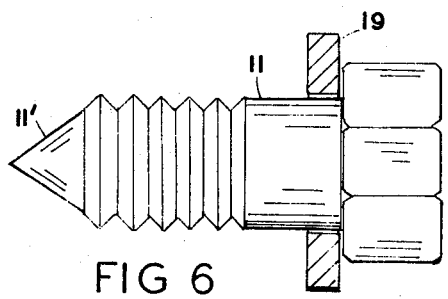
*INVENTOR.*
NATALE TUMMARELLO United States Patent Office 3,507,315
Patented Apr. 21, 1970

3,507,315
FASTENING MEANS FOR WALL PANELS
Natale Tummarello, 2073 Hillside Ave.,
Bellmore, N.Y. 11710
Filed Oct. 21, 1968, Ser. No. 768,993
Int. Cl. E04b 1/38; F16b 39/00
U.S. Cl. 151—41.7
4 Claims

ABSTRACT OF THE DISCLOSURE

A hollow member is fixedly connected to a panel, and the hollow member has an aperture adapted to receive a bolt. A magnetic sheet floatably mounts a nut in said member, said nut being adapted to float on said sheet to adjustably engage a self-centering bolt.

---

This invention relates to means for mounting wall panels such as precast concrete slabs, prestressed concrete beams and girders, or for anchoring heavy machinery.

More particularly, the invention relates to mounting large heavy panels, for instance, synthetic stone panels or other heavy masonry pieces, or heavy components such as large machines.

The invention is not limited to mounting wall panels, but may be used for mounting components in any plane, for instance, on walls, ceilings, floors, etc.

Many large office buildings are being built with their entire outer walls being faced with stone or synthetic stone panels instead of the conventional method of laying bricks. These panels are large and heavy and are generally prefabricated with mounting attachments incorporated or embedded in them so that the panels can be lifted up by a crane and bolted into place on the steel frame of the building.

The steel girders and columns also have connecting angle irons with prefabricated mounting holes to accommodate the bolts for the wall panels. Due to various reasons, it is practically impossible to prefabricate the panels and the steel work for the building frame so that the mounting holes will be perfectly lined up. Therefore, it is necessary that the mounting means be adjustable so that the panels can be mounted with a minimum of special work and labor cost.

For instance, it is desirable that there be a tolerance for lining up the bolts and nuts of the order of ±½ inch up or down and to the right or left.

The present invention provides such a fastening means wherein a hollow member is embedded in the panel. A mounting nut is magnetically floatably positioned within the hollow member so that when the mounting bolt is inserted, it will automatically move the nut into alignment, the end of the bolt having a tapering self-centering portion, and the back of taper is the root diameter of thread to align the thread of bolt and nut.

More specifically, the nut is floatably held within the hollow member by means of a magnetic rubber or plastic sheet which is impregnated with small magnetic elements and magnetized so that the sheet becomes a multi-pole magnet which will hold the nut in the approximate position, the tapered bolt end making final adjustment for thread of bolt into thread of nut. After the bolt has engaged the threads of the nut, the nut will be forced away from the magnetic holder and take up its proper position. The magnetic holder is flexible and may be deformed so as not to interfere with the tightening of the bolt.

Accordingly, a principal object of the invention is to provide new and improved adjustable mounting means for structural panels such as wall, beams, girders, ceiling, or stair panels or stair treads, or anchoring heavy machinery.

Another object of the invention is to provide new and improved means for bolting structural panels to a supporting structure, which mounting means is self-centering so that prefabricated mounting holes can be used with practical tolerances.

Another object of the invention is to provide new and improved prefabricated panel means for adjustable self-centering mounting means formed as a part of the panel.

Another object of the invention is to provide new and improved means for fastening panels to a supporting structure, comprising a hollow member fixedly connected to a panel, said member having an aperture adapted to receive a bolt, means to adjustably and magnetically mount a nut in said member, said nut being adapted to adjustably engage said bolt, said aperture being larger than the diameter of said bolt and said nut being larger than said aperture.

These and other objects of the invention will be apparent from the following specification and drawings, of which:

FIGURE 1 is a sectional view of an embodiment of the invention.

FIGURE 2 is a top view of a hollow member.

FIGURE 3 is a side view of the member of FIGURE 2.

FIGURE 4 is a front view showing aperture and nut inside of hollow member.

FIGURE 5 is an enlarged view of the nut held on magnetic sheet and sheet metal support.

FIGURE 6 is an enlarged view of a bolt with self-centering end.

Referring to the figures, the invention comprises a hollow member 1 which preferably has an extending T-shaped member 2. The purpose of the T-member is to accommodate re-enforcing rods 3 for the masonry panel 4. The hollow member is adapted to be embedded in the cement or masonry panel 4. This is done by tacking the hollow member to the concrete form by means of nails through mounting slots 5 and 6 before the concrete is poured into the form. The hollow member 1 has a magnetic sheet 7, which is preferably re-enforced by a sheet metal support 8. The magnetic sheet is adapted to magnetically hold the nut 10 so that after the panel is held in the mounting position, a bolt 11 may be inserted through a prefabricated hole 12 in steel support 13, usually an angle iron or channel welded to a building frame, for instance, a steel column or girder.

The hollow member has an aperture 14 to receive the bolt and this aperture is made considerably larger than the diameter of the bolt and the diameter of the mounting hole 12. The hollow member may be a casting of malleable cast iron. Its outer surface is preferably tapered to provide a keyed anchor in the panel.

The nut 10 is made larger than the aperture 14 so it will not go through the aperture, but will secure the bolt to the member 1 when the bolt is screwed into the nut completely and tightened.

The bolt head 11, referring to FIGURE 6, has a washer 19 and has a generally rectangular shape with two diagonally positioned corners cut off, and the size of the nut is chosen so that the nut will not rotate within the member 1 when the bolt is tightened, but will only turn far enough so that both of the cutoff corners 15 and 16 will bear against the inside surface of the member 1. The purpose of cutting off the corners is to provide a better bearing surface against member 1. The bolt 11 has a tapered end 11' which is non-threaded for the purpose of self-centering the nut as the bolt is pushed into the threaded shaftway of the nut and the larger end of the taper is the root diameter of the thread.

The member 1 preferably has an aperture 17 which is used to insert first the magnetic sheet 7 mounted to sheet metal 8 and pushed to back of member 1, and secondly, the nut 10. This would be done before the concrete is poured and aperture 17 is then covered up with a plug or adhesive paper to keep the concrete out of the interior of the member 1.

Note that the locating member 8 has feet or edges 8' to properly space the nut within the member 1.

The magnetic sheet may be formed of rubber or neoprene, which is embedded with many ferrite magnetic particles which are then magnetized to form a sheet magnet, which is capable of holding a nut large enough for the present application. The magnetic sheet 7 and its support 8 may be of light construction so that they will not interfere with the insertion of the bolt into the member 1, and these members may be scored, if desired, so that when the bolt is fully inserted in the member 1, they will not interfere with the tapered end bolt, but will be pushed out of the way or deformed so as not to interfere with the proper joining up of the bolt and nut.

The bolt 11 may be a 1" diameter 3" long bolt of high tensile steel. The end ⅜" is preferably to a point to provide the locating drift pin action, and back of taper is root diameter of thread to insure engagement of threads of bolt and nut.

What is claimed is:

1. Means for fastening panels, structural concrete beams, or girders, or heavy machinery to a supporting structure in all planes, comprising:

a hollow member fixedly connected to a panel, beam or girder member, said member having an aperture adapted to receive a bolt, means to adjustably and floatably magnetically mount a ferrous nut in said member, said nut being adapted to adjustably engage said bolt, said aperture being larger than the diameter of said bolt and said nut being larger than said aperture, said means to magnetically mount said nut comprising a magnetic sheet member internally mounted in said hollow member.

2. Apparatus as in claim 1 wherein said magnetic member is a plastic sheet impregnated with magnetic elements.

3. Apparatus as in claim 2 wherein said magnetic sheet is supported by a support member of thin sheet metal ferrous material.

4. Apparatus as in claim 3 wherein said magnetic sheet and sheet metal is flexible enough to be deformed by the end of said bolt when said bolt is fully received into said nut.

References Cited

UNITED STATES PATENTS

| | | | |
|---|---|---|---|
| 950,771 | 3/1910 | Lohmann | 52—710 |
| 2,936,501 | 5/1960 | Koch. | |
| 2,962,317 | 11/1960 | Morse | 151—37 |
| 3,235,917 | 2/1966 | Skobic | 151—41.71 |
| 3,243,374 | 3/1966 | Gillard. | |
| 3,416,274 | 12/1968 | Webb | 151—41.7 |
| 3,425,474 | 2/1969 | Tummarello | 151—41.7 |
| 3,429,601 | 2/1969 | Bremers. | |

MARION PARSON, Jr., Primary Examiner

U.S. Cl. X.R.

52—710; 287—189.36